United States Patent [19]

Lindner et al.

[11] Patent Number: 4,810,739

[45] Date of Patent: Mar. 7, 1989

[54] MOULDING COMPOSITIONS HAVING FLAME-RESISTANT PROPERTIES

[75] Inventors: Christian Lindner, Cologne; Horst Peters, Leverkusen; Josef Buekers, Krefeld; Bernd Urbanneck, Moenchengladbach, all of Fed. Rep. of Germany

[73] Assignee: Bayer Aktiengesellschaft, Leverkusen, Fed. Rep. of Germany

[21] Appl. No.: 619,611

[22] Filed: Jun. 11, 1984

[30] Foreign Application Priority Data

Jun. 21, 1983 [DE] Fed. Rep. of Germany ....... 3322260

[51] Int. Cl.$^4$ .................................................. C08K 5/06
[52] U.S. Cl. ...................................... 524/371; 524/412
[58] Field of Search ............... 524/371, 466, 467, 469, 524/412; 525/146, 147, 199, 67

[56] References Cited

U.S. PATENT DOCUMENTS

| | | | |
|---|---|---|---|
| 3,005,795 | 10/1961 | Busse et al. | 525/160 |
| 3,290,412 | 12/1966 | Goldblum | 525/147 |
| 3,294,871 | 12/1966 | Schmitt et al. | 525/199 |
| 3,392,136 | 7/1968 | Hindersinn et al. | 524/411 |
| 3,673,278 | 6/1972 | Bialous | 524/147 |
| 3,852,393 | 12/1974 | Furukawa et al. | 524/469 |
| 3,852,394 | 12/1974 | Kubota et al. | 260/873 |
| 4,107,232 | 8/1978 | Haaf et al. | 260/876 |
| 4,200,702 | 4/1980 | Gausepohl et al. | 524/469 |
| 4,263,409 | 4/1981 | Liberti | 521/81 |
| 4,280,948 | 7/1981 | Dieck | 260/40 |
| 4,339,556 | 7/1982 | Baer | 524/514 |
| 4,463,130 | 7/1984 | Serini et al. | 525/67 |

FOREIGN PATENT DOCUMENTS

| | | |
|---|---|---|
| 2264104 | 7/1973 | Fed. Rep. of Germany . |
| 2400044 | 7/1974 | Fed. Rep. of Germany . |
| 2434085 | 2/1975 | Fed. Rep. of Germany . |
| 2921325 | 5/1979 | Fed. Rep. of Germany . |
| 2937877 | 4/1980 | Fed. Rep. of Germany . |
| 0019127 | 4/1980 | Fed. Rep. of Germany . |
| 2903100 | 7/1980 | Fed. Rep. of Germany . |
| 3002985 | 8/1980 | Fed. Rep. of Germany . |
| 0034252 | 1/1981 | Fed. Rep. of Germany . |
| 2239512 | 7/1974 | France . |
| 1434621 | 5/1976 | United Kingdom . |
| 2039503 | 8/1980 | United Kingdom . |

*Primary Examiner*—Veronica P. Hoke
*Attorney, Agent, or Firm*—Connolly and Hutz

[57] ABSTRACT

Flame resistant thermoplastic moulding compositions consisting of (a) from 5 to 85 parts, by weight, of an aromatic polycarbonate,
(b) from 15 to 95 parts, by weight, of a SAN-graft polymer,
(c) from 0 to 50 parts, by weight, of a thermoplastic polymer,
(d) optionally from 3 to 15 parts, by weight, (per 100 parts by weight of (a)+(b)+(c) of an organic, low molecular weight, oligomeric or polymeric halogen compound,
(e) from 0.05 to 5 parts, by weight, (per 100 parts by weight of (a)+(b)+(c)) of antimony trioxide, antimony carbonate, bismuth trioxide or bismuth carbonate, and
(f) from 0.05 to 0.5 parts, by weight, based on 100 parts, by weight, of the sum of (a)-(f), of finely-divided tetrafluoroethylene polumer having a fluorine content of from 65 to 76%, by weight, and a process for the production thereof.

8 Claims, No Drawings

MOULDING COMPOSITIONS HAVING FLAME-RESISTANT PROPERTIES

An object of the present invention is flame resistant moulding compositions based on mixtures of aromatic polycarbonate and acrylonitrile-styrene-graft polymers. Acrylonitrile-styrene-graft polymers or SAN-graft copolymers are copolymers of (α-methyl)-styrene and acrylonitrile which are produced by emulsion polymerisation in the prescence of a rubber. A further object of the present invention is a specific process for the production of these moulding compositions.

More exacting demands are continually being made not only on the technical properties but also on the flame resistance of thermoplastic plastics materials. For many applications, the class VO, according to UL Subj. 94, is necessary for a thickness of wall from 3.2 to 1.6 mm. The flame resistance of thermoplastic plastics materials may be improved by the insertion or addition of halogen compounds and optionally additives which have a synergistic effect.

Organic bromine compounds, such as
Hexachlorocyclopentadiene
Hexabromodiphenyl
Octabromodiphenyloxide
Tribromophenoxymethane
Decabromodiphenyl
Decabromodiphenyloxide
Octabromodiphenyloxide
Bis-(2,4,6-tribromophenyl)carbonate
Tetrabromophthalimide
Hexabromobutene
Trichlorotetrabromotoluene
Pentabromonopheylbenzoate
Tris-tribromophenyl-triphosphate
Hexabromocyclododecane,
may be used, optionally in combination with antimony trioxide, as synergists for SAN-graft polymers. The halogen-containing flameproofing agent may also be admixed to thermoplastic mixtures of aromatic polycarbonates and ABS -polymers or introduced into the aromatic polycarbonate by condensing halogen-containing bisphenols (tetrabromobisphenol A).

U.S. Pat. Ser. No. 3,673,278 describes a process in which a composition is obtained by the addition of from 0.1 to 3 parts of polytetrafluoroethylene which has been sintered at a temperature above 330° C. and does not form fibrils to 100 parts of a polycarbonate mixture. The composition has a flame retarding effect and does not drip or disolour during shaping.

It has now been found that the flame retarding properties of mixtures consisting of polycarbonates, SAN-graft polymers and conventional flame proofing additives may be improved if from 0.05 to 0.5%, by weight, of tetrafluoroethylene polymer are added thereto. An unsintered tetrafluoroethylene polymer may be used, if desired. The addition of tetrafluoroethylene polymer has the effect of reducing the tendency of the mouldings to drip when they are burning. It was expected that this effect would not retained in the presence of the SAN-graft polymer and optional vinyl polymer, because they are known to have a particularly unfavourable behaviour in fire.

It has now been found that the thermoplastic processibility of the moulding compositions according to the present invention and the effectiveness of the tetrafluoroethylene polymers may be substantially increased if mixtures consisting of coagulated emulsions of SAN-graft polymer, optionally vinyl monomer polymer, and tetrafluoroethylene polymer are used as starting materials for the production of the moulding compositions.

An object of the present invention is thus flame resistant thermoplastic mouldings consisting of
(a) from 5 to 95 parts, by weight, of an aromatic polycarbonate,
(b) from 5 to 95 parts, by weight, of a SAN-graft polymer,
(c) from 0 to 50 parts, by weight, of a thermoplastic polymer from styrene, α-methylstyrene, acrylonitrile, methyl methacrylate or mixtures thereof,
(d) optionally an organic low molecular weight oligomeric or polymeric halogen compound, in particular a bromine compound in a preferred quantity of from 3 to 15 parts, by weight, per 100 parts, by weight, of the sum of (a)+(b)+(c),
(e) from 0.5 to 5 parts, by weight, per 100 parts, by weight, of the sum of (a)+(b)+(c), of antimony trioxide, antimony carbonate, bismuth trioxide or bismuth carbonate and
(f) from 0.05 to 0.5 parts, by weight, in particular from 0.05 to 0.2 parts, by weight, based on 100 parts, by weight, of the sum of (a), (b), (c), (d) and (e), of finely-divided tetrafluoroethylene polymer having a fluorine content of from 65 to 76%, by weight.

A further object of the present invention is a process for the production of thermoplastic moulding compositions characterised in that (I) an aqueous emulsion of the SAN-graaft polymer (b) having an average particle size of from 0.1 to 2 μm and optionally an aqueous emulsion of the thermoplastic polymer (c) having an average particle size of from 0.05 to 0.4 μm are mixed with a dispersion of a tetrafluoroethylene polymer (f) having an average particle size of from 0.05 to 20 μm, in particular from 0.08 to 10 μm so that the weight ratio of (b) and optionally (c) to (f) is from 80 to 99.9: from 20 to 0.1 (based on the polymeric solids), (II) the polymers are isolated by coagulation from this mixture and are dried and (III) the resulting mixture is mixed in the melt, optionally after granulation, with polycarbonate (a), the additives (a) and (e), optionally further SAN-graft polymer (b) and optionally further thermoplastic polymer (c) and is thermoplastically processed.

Preferred aromatic polycarbonates, within the sense of the invention, are homopolycarbonates and copolycarbonates consisting of one or more of the following diphenols:
Hydroquinone
Resorcinol
Dihydroxydiphenyls
Bis-(hydroxyphenyl)-alkanes
Bis-(hydroxyphenyl)-cycloalkanes
Bis-(hydroxyphenyl)-sulphides
Bis-(hydroxyphenyl)-ethers
Bis-(hydoxyphenyl)-ketones
Bis-(hydoxyphenyl)-sulphoxides
Bis-(hydroxyphenyl)-sulphones and
α,α'-Bis-(hydroxyphenyl)-diisopropylbenzenes,
the phenyl radicals may also carry alkyl or halogen substituents. These and further suitable diphenols are described, for example, in the U.S. Pat. Nos. 3,028,365 2,99,835, 3,148,172, 3,275,601, 2,991,273, 3,271,367, 3,062,781 and 2,999,846, in the German Offenlegungsschriften 1,570,703, 2,063,050, 2,063,052, 2,211,956, 2,211,957, the French Pat. No. 1,561,518 and in "H. Schnell, Chemistry and Physics of Polycarbonates, Interscience Publishers, New York, 1964".

Diphenols which are particularly preferred are:
4,4'-dihydroxydiphenyl
2,2-Bis-(4-hydroxyphenyl)-propane
2,4-Bis-(4-hydroxyphenyl)-2-methylbutane
1,1-Bis-(4-hydroxyphenyl)-cyclohexane
α,α'-Bis-(4-hydroxyphenyl)-p-diisopropylbenzene
2,2-Bis-(3-methyl-4-hydroxyphenyl)-propane
2,2-Bis-(3-chloro-4-hydroxyphenyl)-propane
Bis-(3,5-dimethyl-4-hydroxyphenyl)-methane
2,2-Bis-(3,5-dimethyl-4-hydroxyphenyl)-propane
Bis-(3,5-dimethyl-4-hydroxyphenyl)-sulphone
2,4-Bis-(3,5-dimethyl-4-hydroxyphenyl)-2-methylbutane
1,1-Bis-(3,5-dimethyl-4-hydroxyphenyl)-cyclohexane
α,α'-Bis-(3,5-dichloro-4-hydroxyphenyl)-propane and
2,2-Bis-(3,5-dibromo-4-hydroxyphenyl)-propane.

Hitherto the best results were obtained using:
2,2-Bis-(4-hydroxyphenyl)-propane
2,2-Bis-(3,5-dimethyl-4-hydroxyphenyl)-propane
2,2-Bis-(3,5-dichloro-4-hydroxyphenyl)-propane
2,2-Bis-(3,5-dibromo-4-hydroxyphenyl)-propane and
1,1-Bis-(4-hydroxyphenyl)-cyclohexane.

Polycarbonates which are based on one or more of the above-mentioned preferred diphenols are preferred as aromatic polycarbonates. Copolycarbonates which are based on 2,2-bis-(4-hydroxyphenyl)-propane and on one of the other particularly preferred diphenols are particularly preferred. Moreover, polycarbonates which are based solely on 2,2-bis-(4-hydroxyphenyl)-propane or 2,2-bis-(3,5-dimethyl-4-hydroxyphenol)-propane are particularly preferred.

The aromatic polycarbonates may be produced according to known processes, such as a melt transesterification from bisphenol and diphenyl carbonate and in solution consisting of bisphenols and phosgene. The solution may be homogeneous ("pyridine process") or may be heterogeneous ("two-phase inter facial process"). According to the present invention, polycarbonates which are produced in solution, particularly according to the two-phase inter facial process, are suitable.

The aromatic polycarbonates may be branched by the incorporation of small quantities, preferably a quantity of from 0.05 to 2.0 mol % (based on the diphenols which are used) of trifunctional trifunctional compounds, such as compounds having three or more than three phenolic hydroxy groups.

The aromatic polycarbonates should generally have an average molecular weight $\overline{M}_w$ of from 10 000 to more than 200 000, preferably from 20 000 to 80 000 (determined by measuring the rel. viscosity in $CH_2Cl_2$ at 25° C. at a concentration of 0.5%, by weight.)

SAN-graft polymers within the context of the present invention are in particular emulsion graft polymers of mixtures consisting of from 10 to 40 parts, by weight, of acrylonitrile and from 90 to 60 parts, by weight, of styrene and/or α-methylstyrene on particle-shaped, or at least partially cross-linked diene rubbers or alkyl acrylate rubbers having an average particle size of from 0.1to 2 μm.

The term average particle size is to be understood, within the context of the present invention, as always designating the average particle diameter $d_{50}$, that is the diameter above and below which in each case 50%, by weight, of the particles lie.

Preferred diene rubbers are polybutadiene, polyisoprene and butadiene copolymers having up to 50%, by weight, of monocopolymerised monomers such as acrylonitrile, styrene, methyl methacrylate or butyl acrylate. The SAN-graft polymers preferably contain from 8 to 80%, by weight, of diene rubber, more preferably from 20 to 60%, by weight. These graft polymers are known and may be produced by radically graft copolymerising a monomer mixture in aqueous emulsion, a mixture consisting of styrene and acrylonitrile on the particle-shaped diene rubbers which are present in the aqueous emulsion; after graft copolymerisation of the monomer mixtures, aqueous emulsions of the SAN-graft polymers are produced which are subsequently, optionally after stabilisation with phenolic antioxidants, worked-up by conventional, known coagulation processes and isolated. SAN-graft polymers, which are suitable according to the present invention, are also graft polymers of styrene and acrylonitrile on acrylate rubbers which are derived as monomers from Cl-10-alkylacrylates, and in particular from n-butyl acrylate, hexylacrylate, ethylhexyl acrylate and ethyl acrylate. The acrylate rubbers which are suitable as a graft base for styrene and acrylonitrile may contain comonomers such as styrene, vinyl ether, butadiene, methyl methacrylate or vinyl acetate in a quantity of up to 40%, by weight, copolymerised therein. These acrylate rubbers are at least partially cross-linked and are produced by the radical emulsion polymerisation of suitable monomer mixtuers, optionally in the presence of polyfunctional, ethylenically unsaturated monomers which act as cross-linking agents such as divinylbenzene, alkylene glycol-di(meth)acrylates, triallylisocyanurate and polyether glycol-di(meth)acrylates. These graft polymers preferably contain from 8 to 80%, by weight, of acrylate rubber, in particular from 20 to 60%, by weight, and may be isolated from the emulsions for example by conventional coagulating processes. Styrene-acrylonitrile-graft polymers on acrylate rubber particles having a core/sheath structure are particularly preferred.

Thermoplastic polymers the context of the present invention are homo- or co-polymers of ethylenically unsaturated monomers, the polymers of which have resin-like, thermoplastic properties; the following are examples of ethylenically unsaturated monomers: styrene, α-methylstyrene, alkyl styrene, halo-styrene, acrylonitrile, methacrylo nitrile, methyl methacrylate, cyclohexylmethacrylate, maleic acid anhydride and maleic acid ester; preferred monomers are styrene, α-methyl styrene, acrylonitrile, methyl methacrylate and maleic acid anhydride; particular preferred are styrene-acrylonitrile-copolymers, α-methyl styrene-acrylonitrile-copolymers, poly methyl methacrylate or styrene-maleic acid anhydridecopolymers. These polymers having a molecular weight of from about 20,000 to $2-10^5$ and may be produced, for example, by emulsion polymerisation, mass polymerisation, precipitation polymerisation, solution polymerisation or suspension polymerisation. Preferred polymers are radically produced by emulsion or mass polymerisation.

The following are examples of organic flame-retarding halogen compounds (d) within the sense of the present invention:
decabromodiphenylether
octabromodiphenyl
octabromodiphenylether
trichlorotetrabromotoluene;

polycarbonates which are equipped such that they are flame-resistant are, for example, polycarbonates which contain from 5 to 20 mol % of tetrabromobisphenol A or tetrachlorobisphenol A condensed therein.

Oligomers or polymeric flame-retarding halogen compounds are in particular polycondensates or polycarbonates which are based on tetrabromo- or tetrachlorobisphenol A.

The synergistic components antimony- or bismuth trioxide or -carbonate are preferably used in the form of finely divided powders for the production of the moulding composition according to the present invention; $Sb_2O_3$ dispersions may be admixed with SAN-graft polymer emulsion as an alternative process and then worked up together by co-coagulation; concentrates of this type are then particularly suitable for equipping thermoplasts so that they are flame resistant (c.f. European Patent (1913).

The tetrafluoroethylene polymers (f) which are suitable according to the present invention are polymers which have a fluorine content of from 65 to 76%, by weight, preferably from 70 to 76%, by weight. Examples of these polymers are polytetrafluoroethylene, tetrafluoroethylene-hexafluoropropylene-copolymers or tetrafluoroethylene copolymers having small quantities of fluorine-free copolymerisable ethylenically unsaturated monomers. Polymers (f) are known. They may be used in finely-divided form, usually as a powder.

(C.f. "Vinyl and Related Polymers" by Schildknecht, Verlag John Wiley & Sons, Inc., New York, 1952, Page 484-494; "Fluoropolymers" by Wall, Verlag Wiley-Interscience, Section of John Wiley & Sons, Inc., New York, 1972; "Encyclopedia of Polymer Science and Technology", Verlag Interscience Publishers, Section of John Wiley & Sons, Inc., New York, Vol. 13 1970, Page 623-654; "Modern Plastics Encyclopedia", 1970-1971, Vol. 47. No. 10A, October 1970, Verlage McGraw-Hill, Inc., New York, Pages 134, 138 and 774; "Modern Plastics Encyclopedia", 1975-1976, October 1975; Vol. 52, No. 10A Verlag McGraw-Hill, Inc., New York, Page 27, 28 and 472, and U.S. Pat. Ser. Nos. 3,671,487, 3,723,373 and 3,838,092).

The moulding compositions according to the present invention (containing components (a), (b), (c), (d), (e) and (f), ) have a greatly improved flame resistance in comparison with moulding compositions which do not have tetrafluoroethylene polymer.

In particular the melt of the moulding compositions does not drip as much or is even prevented from dripping during buring. If the moulding compositions according to the present invention are produced, for example, by melt compounding (in kneaders or extruders), from granulated material or powders of components (a) to (f), moulding compositions which have a high degree of flame resistance are obtained. Mouldings which are produced from these compositions sometimes have a defective surface, with for example, microcracks or waves.

This is easily prevented if the moulding compositions are produced as follows:

An aqueous emulsion (latex) of a graft polymer (b) having an average latex particle size of from 0.1 to 2 μm, in particular from 0.2 to 0.6 μm, are mixed with a finely-divided dispersion of a tetrafluoroethylene polymer having an average dispersion particle size of from 0.05 to 20 μm, in particular from 0.08 to 10 μm; suitable tetrafluoroethylene dispersions conventionally have a solid substance content of from 30 to 70%, by weight, in particular from 50 to 60%, by weight. The weight ratio of graft polymer (b) to polymer (f) in the dispersion mixture is from 99.9:0.1 to 80:20. The dispersion mixture is subsequently worked up in a conventional manner such as by spray drying, freeze drying or coagulation by means of the addition of inorganic or organic salts, acids, bases or organic, water-miscible solvents such as alcohols, ketones preferably at a temperature from 20° to 150° C., particularly from 50° to 100° C. If necessary the mixture may be dried at from 50° to 200° C., preferably from 70° to 100° C.

If the thermoplastic polymers (c) are present in the form of a latex, the tetrafluoroethylene polymers (in the form of the finely-divided dispersions thereof) may be mixed therewith, worked up and the mixture may be used for the production of the moulding compositions.

The mixtures consisting of (b) and (f), or (c) and (f), or (b) and (c) and (f) are melt compounded with polycarbonate (a), additives (a) and (e), and optionally further tetrafluoroethylene polymer-free graft polymer (b) and (c), at a temperature of from 200° to 330° C. in convetional aggregates such as kneaders, extruders and double shaft screws.

The mouldings which are produced by injection moulding from the moulding compositions have flawless surfaces.

The moulding compositions according to the present invention may be used for the production of mouldings of every type. Mouldings may be produced in particular by injection moulding. The following are examples of mouldings which may be produced:

Housing parts of every type (e.g. for household apparatus such as juice presses, coffee machines, mixers) or covering plates for the construction industry and parts for the automobile industry. They are also used in electrical engineering because they have excellent electrical properties. A further form of processing is the production of mouldings by deep-drawing from plates or films which have been previously produced.

Particle size is always to be understood as designating the average particle diameter $d_{50}$, which is determined by ultra-centrifuge measurements according to W. Scholtan et al. Colloids. u. z. Polymere 250 (1972) 783-796.

EXAMPLES (A) Polymers and additives which are used

1. Aromatic polycarbonate consisting of 10%, by weight, of tetrabromobisphenol A and 90%, by weight, of bisphenol A having a relative viscosity, measured in $CH_2Cl_2$ at 25° C., of 1.284 (0.5%, by weight, solution).

2. Oligomer polycarbonate consisting of tetrabromobisphenol A and having an average polycondensation degree of 5.

3. SAN-graft polymer of 50%, by weight, of styreneacrylonitrile mixture (in a weight ratio of 72:28) on 50% particle-shaped polybutadiene having an average particle size ($d_{50}$) of 0.4 μm which is obtained by emulsion polymerisation.

4. Thermoplastic polymer consisting of styrene and acrylonitrile having an acrylonitrile content of 26%, by weight, and an average molecular weight of 60,000.

5. Polytetrafluoroethylene "Teflon 702N" (Dupont) as powder. The polymer has an F-content of 73.7%, by weight.

6. Dispersions of tetrafluoroethylene polymer "Teflon 42N" (Dupont); the dispersed polymer has an F- content of 73.7%, by weight, or dispersions of tetrafluoroethylene polymer "Hostaflon TF 5032" (Hoechst); this dispersed polymer has an F-content of 70.5%, by weight.

7. Sb₂O₃ ("Stibiox MS").
8. Carbon black "Black-Pearls 900" (Cabot).

(B) The production of the moulding compositions

1. The production by the direct compounding of all components:

Compounding on a Banbury-internal kneader (Pomini-Farrel) of the BR type (1.2 l) or of the 00C type (3 l) at from 230° to 240° C. The parts, by weight, which are given in the Tables are directly compounded.

2. Production according to the present process:

The dispersion of the tetrafluoroethylene polymer (A) (6) is mixed with the emulsion of the SAN-graft polymer (A) (3) and possibly with the emulsions of the thermoplastic polymer (A) (4), and are stabilised with 1.8%, by weight, based on the polymer solid substance, of phenolic anti-oxidants. The mixture is coagulated with an aqueous solution of MgSO₄ (Epsom salt) and acetic acid at pH 4–5 at from 85° to 95° C., filtered and washed until virtually free of electrolyte and subsequently freed from the main quantity of water by centrifugation and then dried at 100° C. to form a powder.

This powder may then be compounded with the further components in the aggregates which are described in (B) (1).

(C) Composition of the moulding compositions

Tables (1) and (2) show the composition of the moulding compositions (given in parts by weight):

TABLE 1

|  | 1 | 2 | 3 | 4 | 5 | 6 |
|---|---|---|---|---|---|---|
| Polycarbonate (A) (1) | 72 | 72 | 72 | 70 | 70 | 70 |
| Polycarnonate (A) (2) | 1 | 1 | 1 | 1 | 1 | 1 |
| Graft polymer (A) (3) | 11.2 | — | — | 14 | — | — |
| Polymer (A) (4) | 16.8 | 16.8 | 16.8 | 14 | 14 | 14 |
| Sb₂O₃ | 2 | 2 | 2 | 2 | 2 | 2 |
| Carbon Black | — | — | — | 1 | 1 | 1 |
| Mixture consisting of 97%, by weight, of (A) (3) and 2.5%, by weight, of Teflon 42N, produced within the sense of the present invention (according to (B) (2)) | — | 11.2 | — | — | 14 | — |
| Mixture consisting of 97.5%, by weight, of (A) (3) and 2.5%, by weight, of Hostaflon TF 5032, produced within the sense of the present invention (according to (B) (2)) | — | — | 11.2 | — | — | 14 |

The components are compounded in the aggregate which is given in (B) (1)

TABLE 2

|  | 7 | 8 | 9 | 10 | 11 |
|---|---|---|---|---|---|
| Polycarbonate (A) (1) | 70 | 70 | 70 | 70 | 70 |
| Sb₂O₃ | 2 | 2 | 2 | 2 | 2 |
| Teflon 702N-powder (A) (5) | — | 0.25 | — | — | — |
| ABS[1] | 28 | 28 | — | 28 | 28 |
| Mixture consisting of 99% of ABS[1] [2] and 1% of Hostaflon TF 5032 produced within the sense of the present invention (according to (B) (2))Powder[3], obtained from the Hostaflon TF 5032 dispersion | — | — | 28 | — | — |
|  | — | — | — | 0.25 | 0.1 |

[1]ABS consists of 60 parts, by weight, of resin (A) (4) and 40 parts, by weight, of graft polymer (A) (3), the components are produced by emulsion polymerisation, the lattices are mixed and precipitated at pH 4–5 to form a powder and are worked up.
[2]The latex mixture consisting of (A) (3) and (A) (4) is mixed with a dispersion of "Hostaflon TF 5032" and then worked up at pH 4–5 to form a powder.
[3]The dispersion "Hostaflon TF 5032" is coagulated, filtered and the powder is dried at 70° C.

(D) Properties of the moulding compositions

The moulding compositions (C) 1–11 are injection moulded at 260° C. (aggregate: Werner-Pfleiderer-Screw DKS 275, locking pressure 275 MP, screw diameter 56 mm, length L/D-23/1).

| Moulding Composition C | Behaviour in Fire according to UL Subj. 94 | | | | | | | | | | |
|---|---|---|---|---|---|---|---|---|---|---|---|
|  | 1 | 2 | 3 | 4 | 5 | 6 | 7 | 8 | 9 | 10 | 11 |
| 1.6 mm | V-2-/—/10 | V-0 | V-0 | V-2/—/5 | V-0 | V-0 | V2-1/—/9 | V-0 | V-0 | V-0 | V-0 |
| 2.5 mm | V-3-/—/2 | V-0 | V-0 | V-2-/—/5 | V-0 | V-0 | — | — | — | — | — |
| 3.2 mm | — | — | — | — | — | — | V-2-1/—/9 | V-0 | V-0 | V-0 | V-0 |

| Structure of the injection mouldings[1] | | | | | | | | | | | |
|---|---|---|---|---|---|---|---|---|---|---|---|
| o.k. | o.k. | o.k. | o.k. | o.k. | o.k. | o.k. | n.i.o. | o.k. | n.i.o. | n.i.o. |

Mechanical Properties
Determined on standard small rods; notched impact strength according to DIN 53453, Vicat-B according to DIN 53 460

| Moulding Composition C 1 | 1 | 2 | 3 | 4 | 5 | 6 | 7 | 8 | 9 | 10 | 11 |
|---|---|---|---|---|---|---|---|---|---|---|---|
| Notched Impact strength (kJ/m²) | 21 | 23 | 22 | 34 | 36 | 34 | 34 | 33 | 30 | 34 | 33 |
| Vicat B temperature (°C.) | 136 | 135 | 136 | 137 | 138 | 139 | 138 | 137 | 136 | 136 | 137 |

[1]Judged visually on relatively large housings which have a shot of 245 g or sample plates 40 × 60 mm in size and which have a thickness of 4 mm
o.k. = flawless surface
n.i.o. = surface is substantially broken by microcracks.

As can be seen from the Tables in Section D, the flame resistance of the moulding compositions is greatly improved by the addition of small quantities of tetrafluoroethylene polymer. However, if fluoroethylene polymer is introduced in the form of a powder when the components are being compounded, good flame resistance is achieved but the surfaces of the mouldings produced from moulding compositions of this type are not always flawless; they display microcracks or waves. If tetrafluoroethylene polymer dispersions are worked up to produce mouldings in the process according to the present invention, mouldings which do not have any surface disruptions may be injection moulded. Inspite of the presence of the tetrafluoroethylene polymers in the moulding compositions, relevant mechanical properties are not impaired.

We claim:

1. A process for the production of molding compositions which meet the flame resistance standard V-O, according to U.L. Subj. 94, for a wall thickness of 1.6 mm, comprising:

from 5 to 85 parts, by weight, of an aromatic polycarbonate;

from 15 to 95 parts, by weight, of an SAN-graft polymer; from 0.05 to 5 parts, by weight, per 100 parts, by weight of the sum of the aromatic polycarbonate and the SAN-graft polymer, of at least one synergist selected from antimony trioxide, antimony carbonate, bismuth trioxide and bismuth carbonate; and from 0.05 to 0.5 parts of a tetrafluoroethylene polymer, by weight, based on 100 parts by weight of the sum of the aromatic polycarbonate, the SAN-graft polymer, the synergist, and the tetrafluoroethylene polymer, where the tetrafluoroethylene polymer is finely divided and has a fluorine content of from 65 to 76%, by weight of the tetrafluoroethylene polymer; the steps comprising:

I. mixing an aqueous emulsion of the SAN-graft polymer, having an average particle size of from 0.1 to 2 $\mu$m, with a sufficient amount of a dispersion of the tetrafluoroethylene polymer having an average particle size of from 0.05 to 20 $\mu$m, so that the ratio of SAN-graft polymer to tetrafluoroethylene polymer, based on the polymer solids, is from 80:20 to 99.9:0.1;

II. isolating the polymers by coagulation, then drying; and

III. then mixing the resulting admixture in a melt with the aromatic polycarbonate and the synergist and then thermoplastically processing the resulting melt mixture.

2. A process in accordance with claim 1 further comprising up to 50 parts, by weight, of a thermoplastic polymer, where the amount of synergist is based on 100 parts, by weight of of the sum of the aromatic polycarbonate, the SAN-graft polymer and the thermoplastic polymer and where the amount of tetrafluoroethylene polymer is based on 100 parts, by weight of the sum of the aromatic polycarbonate, the SAN-graft polymer, the thermoplastic polymer, the synergist, and the tetrafluoroethylene polymer; wherein in I. the aqueous emulsion of the SAN-graft polymer and an aqueous emulsion of the thermoplastic polymer, having an average particle size of 0.05 to 0.4 $\mu$m, is mixed with the dispersion of the tetrafluoroethylene polymer in a weight ratio of thermoplastic polymer to tetrafluoroethylene polymer, based on the polymer solids, is of 80:20 to 99.9:0.1.

3. A process in accordance with claim 1 further comprising from 3 to 15 parts, by weight, per 100 parts, by weight of the sum of the aromatic polycarbonate and the SAN-graft polymer, of an organic, low molecular weight, oligomeric or polymeric halogen compound, where the weight of the tetrafluoroethylene polymer is based on 100 parts by weight of the sum of aromatic polycarbonate, the SAN-graft polymer, the oligomeric or polymeric halogen compound, the synergist, and the tetrafluoroethylene polymer; wherein in III. the resulting admixture is mixed in the melt with the aromatic polycarbonate, the oligomeric or polymeric halogen compound, and the synergist and is then thermoplastically processed.

4. A process in accordance with claim 2 further comprising from 3 to 15 parts, by weight, per 100 parts by weight of the sum of the aromatic polycarbonate, the SAN-graft polymer and the thermoplastic polymer, of an organic, low molecular weight, oligomeric or polymeric halogen compound where the weight of the tetrafluoroethylene polymer is based on 100 parts by weight of the sum of the aromatic polycarbonate, the SAN-graft polymer, the thermoplastic polymer, the oligomeric or polymeric halogen compound, the synergist and the tetrafluoroethylene polymer; wherein in III. the resulting admixture is mixed in the melt with the aromatic polycarbonate, the oligomeric or polymeric halogen compound and the synergist and is then thermoplastically processed.

5. A process in accordance with claim 1 further comprising granulating the resulting admixture of III prior to mixing in the melt.

6. A process in accordance with claim 4 further comprising granulating the resulting admixture of III prior to mixing in the melt.

7. A process in accordance with claim 1 further comprising mixing additional SAN-graft polymer in the melt prior to thermoplastic processing.

8. A process in accordance with claim 1 further comprising mixing additional thermoplastic polymer in the melt prior to thermoplastic processing.

* * * * *

UNITED STATES PATENT AND TRADEMARK OFFICE
CERTIFICATE OF CORRECTION

PATENT NO. : 4,810,739

DATED : March 7, 1989

INVENTOR(S) : Lindner et al.

It is certified that error appears in the above-identified patent and that said Letters Patent is hereby corrected as shown below:

Col. 9, line 20, delete "5 to 85" and insert --5 to 95--.
line 22, delete "15 to 95" and insert --5 to 95--
line 26, after "antimony trioxide" insert --and--.
lines 27-28 delete ", bismuth trioxide and bismuth carbonate".

Signed and Sealed this

Fifth Day of January, 1993

Attest:

DOUGLAS B. COMER

Attesting Officer

Acting Commissioner of Patents and Trademarks